United States Patent [19]

Fukaya

[11] Patent Number: 5,057,732

[45] Date of Patent: Oct. 15, 1991

[54] ELECTRIC MOTOR HAVING A MOLDED HOUSING AND CONNECTOR PLATES PROJECTED THEREON

[75] Inventor: Katsuyoshi Fukaya, Aichi, Japan

[73] Assignee: Aisan Kogyo Kabushiki Kaisha, Aichi, Japan

[21] Appl. No.: 587,115

[22] Filed: Sep. 24, 1990

[30] Foreign Application Priority Data

Sep. 28, 1989 [JP] Japan ............................ 1-114088[U]

[51] Int. Cl.⁵ .............................................. H02K 3/04
[52] U.S. Cl. .................................... 310/208; 310/194; 310/214; 310/89; 310/71
[58] Field of Search ............... 310/208, 194, 261, 254, 310/214, 149, 89, 71, 49 R, 45

[56] References Cited

U.S. PATENT DOCUMENTS

| | | | |
|---|---|---|---|
| 3,571,640 | 3/1971 | Watt | 310/171 |
| 3,633,055 | 1/1972 | Maier | 310/156 |
| 4,660,015 | 4/1987 | Finck et al. | 336/192 |
| 4,720,646 | 1/1988 | Torimoto | 310/71 |
| 4,751,411 | 6/1988 | Fukaya et al. | 310/49 R |
| 4,764,696 | 8/1988 | Fukaya et al. | 310/49 R |
| 4,926,540 | 5/1990 | Kato | 29/596 |
| 5,004,941 | 4/1991 | Ohzeki et al. | 310/49 R |
| 5,006,765 | 4/1991 | Schmider | 310/71 |

Primary Examiner—Steven L. Stephan
Assistant Examiner—Edward H. To
Attorney, Agent, or Firm—Oblon, Spivak, McClelland, Maier & Neustadt

[57] ABSTRACT

A stator coil used in an electric motor, including a bobbin formed by insulating material and composed of a hollow cylindrical portion and two end plates provided projectingly toward the outside in the radial direction from the cylindrical portion at both ends in the axial direction thereof, at least two connector plates made of conductive material of which one end is inserted into an outer periphery of one end plate of the bobbin and of which the other end is extended outside in the radial direction of the end plate, and an exciting coil wound on the cylindrical portion. One terminal portion of a covered wire which constitutes the exciting coil is conductively connected to the one connector plate, and the other terminal portion is conductively connected to the other connector plate. The connector plates are insulatingly held in a housing of the electric motor and their free ends are provided projectingly outside the outer surface of the housing, thereby forming a connector.

9 Claims, 2 Drawing Sheets

ELECTRIC MOTOR HAVING A MOLDED HOUSING AND CONNECTOR PLATES PROJECTED THEREON

BACKGROUND OF THE INVENTION

1. Field of the Invention

The present invention relates to an electric motor, and particularly to a stepping motor.

2. Description of the Prior Art

There have been adopted various kinds of means for connection to an end portion of a coil wire which forms a coil of an electric motor and a wire to be connected to a power source.

In JP-U-62 160508 (Japanese KOKAI Utility Model Application), there is described an electric motor in which two end plates formed at both ends of a cylindrical portion of a coil bobbin are bridged by a printed plate in a direction parallel to the cylindrical portion, and the end portion of the coil wire and the wire to be connected to the power source are connected with each other using a metal foil printed on the printed plate as a relay terminal. In this electric motor, before the coil wire is wound on the coil bobbin, the printed plate can not be fixed to the coil bobbin. In the manufacturing process of the electric motor, therefore, the work for mounting the printed plate on the coil bobbin is necessary between the work for winding the coil wire on the coil bobbin and the work for connecting the coil wire and the wire to be connected to the power source, by which the working hours can not be reduced. Further, since portions for connecting the coil wire and/or the wire to be connected to the power source are plural, a faulty connection is liable to occur. Consequently, the connection by soldering is necessary, resulting in requiring a lot of working man-hours.

In JP-U-62 132262, there is described an electric motor in which a terminal plate is fixed to a coil bobbin, an end portion of a coil wire of a coil wound on a coil bobbin is connected to the terminal plate, a connector terminal supplied with electric power from a power source is separately prepared, and the connector terminal is made to contact with the terminal plate. In manufacturing this electric motor, it is necessary to prepare the connector terminal separately besides the terminal plate, therefore many components for the electric motor are necessary. Consequently, man-hour for mounting many components is necessary. Further, contacting portions and portions for connecting wires between the components are increased, by which faults due to bad contact are liable to occur.

SUMMARY OF THE INVENTION

The present invention relates to an electric motor, and particularly to an electric motor which has a simple constitution for connecting an end portion of a coil wire for forming a stator coil thereof to a member to be supplied with a current from an electric power source, and is suitable to provide a stepping motor.

A primary object of the present invention is to provide an electric motor having a small number of components thereof and having a simple constitution in connecting end portions of the coil wire of the stator coil, to a member to which a current from an electric power source is to be supplied.

The other object of the present invention is to provide an electric motor having a member for fixing the end portions of the coil wire which is formed as the member to which the current from the electric power source is to be supplied and which project outside an outer surface of a housing of the electric motor.

Another object of the present invention is to provide an electric motor having the housing molded by an insulating hard synthetic resin, the member for fixing the end portion of the coil wire being fixed to the housing, and the member further forming a connector to be connected to the electric power source together with a molding portion formed on the outer surface of the housing.

Further objects of the present invention will be clarified by the following description.

According to the present invention, there is provided an electric motor which comprises a housing, a stator disposed fixedly in the housing including a coil bobbin formed in hollow cylindrical shape by insulating material, an exciting coil wound on the coil bobbin, and at least two connector plates made of conductive material, fixed at one end thereof to the coil bobbin at a position apart from the exciting coil, extended in parallel with each other and projected outside in the direction perpendicular to the center axis of the coil bobbin, and a rotor supported rotatably in the housing concentrically to the stator. Both ends of the coil wire which constitutes the exciting coil wound on the coil bobbin of the stator are conductively fixed to either one of the connector plates fixed to the coil bobbin, respectively. The connector plates are held insulatingly in the housing, and free end portions of the connector plates are made to project outside the outer surface of the housing.

According to the above-mentioned constitution, when one end of the coil wire which constitutes the exciting coil has been fixed to one connector plate, the coil wire has been wound on the coil bobbin, and the other end of coil wire which constitute the exciting coil has been conductively fixed to the other connector plate, then the exciting coil can be formed. When a female connector connected to the electric power source is connected to the free end portions of the connector plates projected outside the outer surface of the housing, the exciting coil can be supplied with a current from the electric power source.

Also, according to the present invention, there is provided an electric motor in which the housing is molded by an insulating hard synthetic resin, the connector plate is fixed to the housing during molding, and a male connector is formed by the free end portions of the connector plates projected outside the outer surface of a housing and the molded portions formed on the outer surface of the housing.

Further, according to the present invention, there is provided a stepping motor having such a constitution as described above, particularly, a stepping motor in which two stators having the same constitution and covered by a case made of soft magnetic material is fixed in the housing and a rotor having a multipolarly magnetized permanent magnet positioned on the outer circumferential surface of the rotor is rotatably in the housing concentrically to the stators.

BRIEF DESCRIPTION OF THE DRAWINGS

Various objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
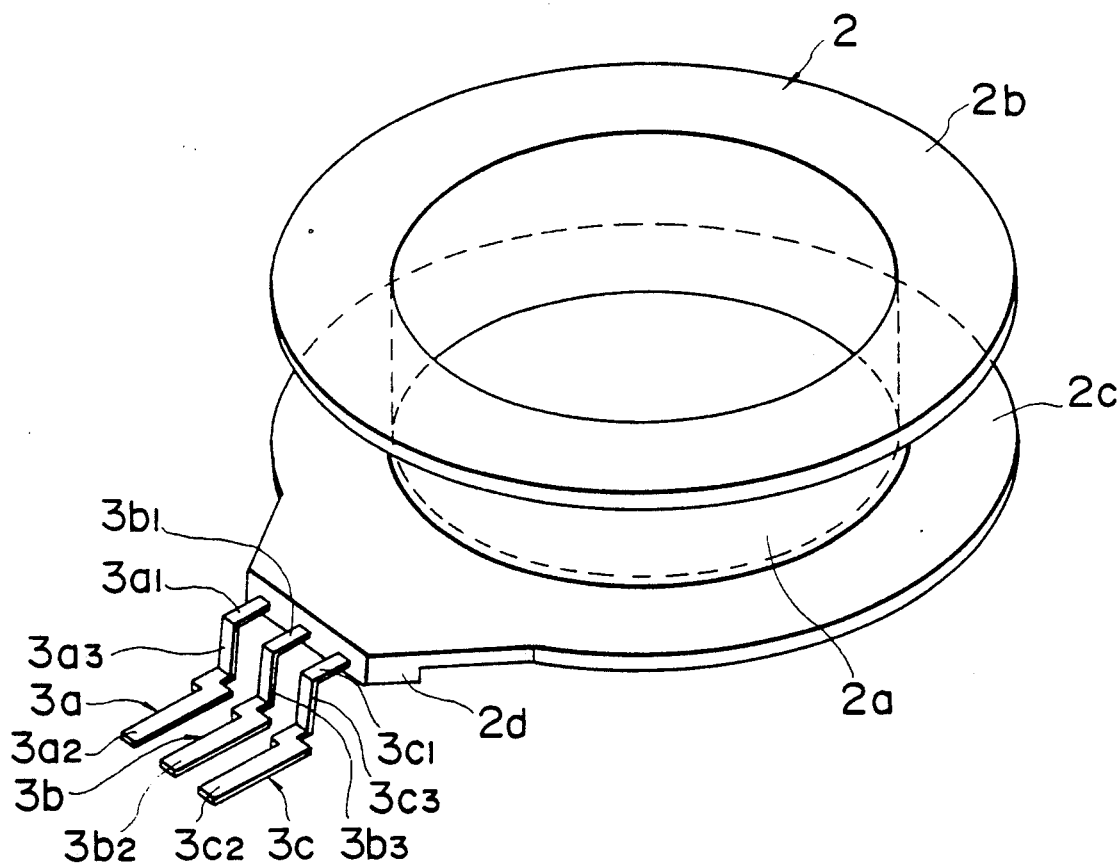
FIG. 1 is a perspective view of an assembly of a coil bobbin and connector plates used in a stator of an electric motor according to the present invention.

FIG. 1 shows a coil bobbin and conductive connector plates fixed thereto for a stepping motor which is an embodiment according to the present invention.

The coil bobbin 2 comprises a cylindrical portion 2a, and annular end portions 2b and 2c projected perpendicularly in the axial direction of the cylindrical portion 2a at the both ends of the cylindrical portion 2a, all of which are formed in a unitary body by insulating material. At one end plate 2c, a projecting portion 2d is formed at one portion of the outer peripheral edge of the end plate 2c outside in the radial direction, and three connector plates 3a, 3b, and 3c made of conductive material are fixed to the projecting portion 2d at a position outside in the radial direction of the end plate 2c.

The connector plates 3a, 3b, and 3c are inserted into the projecting portion 2d of the end plate 2c at their one ends in a substantially diametric direction and fixed so as to be positioned substantially parallel to one another. These connector plates 3a, 3b, and 3c may be temporarily fixed to a mold for forming the coil bobbin 2, and their respective one ends can be fixed to the projecting portion 2d of the end plate 2c when the coil bobbin 2 is molded.

Figure 2:
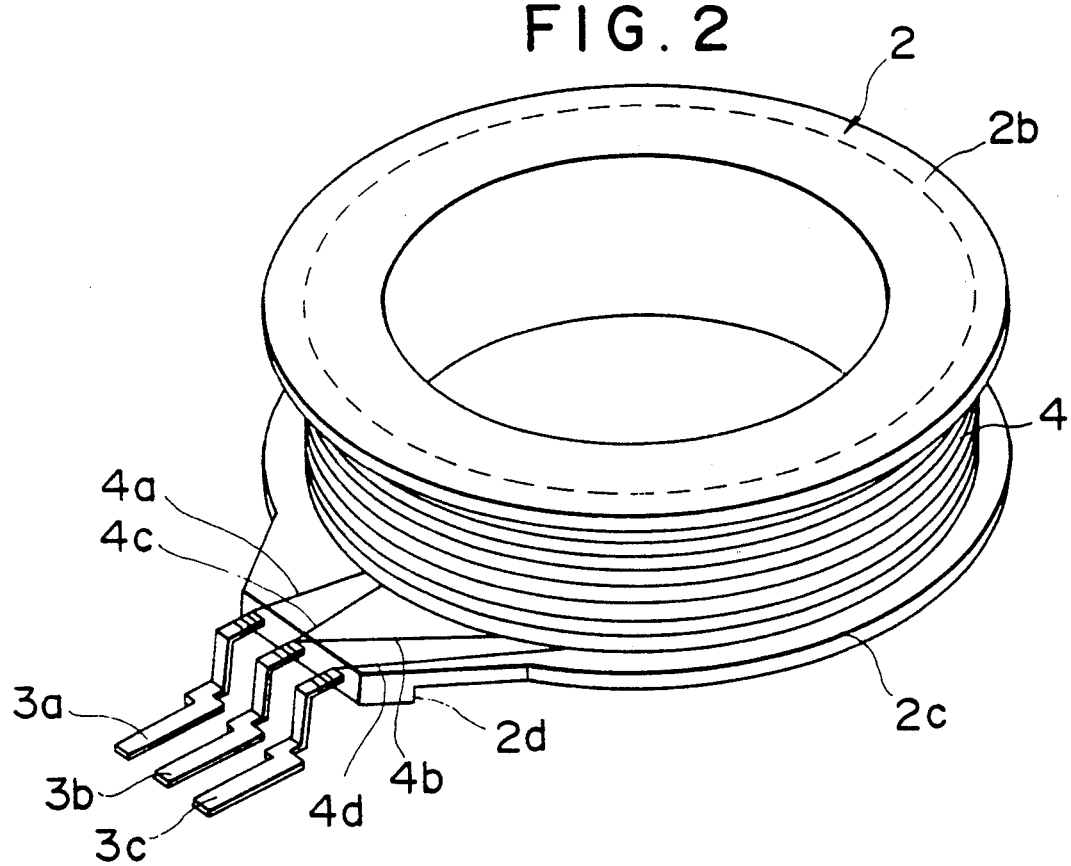
FIG. 2 is a perspective view showing a state in which the assembly of the coil bobbin and the connector plates shown in FIG. 1 is wound by two coil wires to form an exciting coil.

A coil 4 wound on the cylindrical portion 2a of the coil bobbin 2 shown in FIG. 2 comprises two coil wires. The first coil wire is conductively fixed at one end $4a$ thereof to the connector plate 3a and at the other end $4b$ thereof to the connector plate 3b. The second coil wire is conductively fixed at one end $4c$ thereof to the connector plate 3b and at the other end $4d$ thereof to the connector plate 3c. In the present embodiment, after the one end $4a$ of the first coil wire is fixed to the connector plate 3a and the one end $4c$ of the second coil wire is fixed to the connector plate 3b, the two coil wires are wound on the cylindrical portion 2a of the coil bobbin 2. When the two coil wires have been wound on the cylindrical portion 2a, the other end $4b$ of the first coil wire is fixed to the connector plate 3b and the other end $4d$ of the second coil wire is fixed to the connector plate 3c.

Thus, the other end $4b$ of the first coil wire and the other end $4d$ of the second coil wire can be fixed to the predetermined connector plate with no error. Also, the work of winding the coil 4 and fixing the respective both ends of the coil 4 to the connector plates can be automatically done by a machine.

As apparent particularly in FIG. 1, the connector plates 3a, 3b, and 3c are inserted at their one ends into the projecting portion 2d of the end plate 2c of the coil bobbin 2 in a direction substantially perpendicular to the center axis of the cylindrical portion 2a of the coil bobbin 2, and at the same time, fixing portions $3a_1$, $3b_1$, and $3c_1$ of the connector plates 3a, 3b and 3c are located at a position outside the projecting portion 2d for fixing the both ends of the first and second coil wires which form the coil 4. The respective free ends of the connector plates 3a, 3b, and 3c are formed with terminal portions $3a_2$, $3b_2$, and $3c_2$ in parallel with the fixing portions $3a_1$, $3b_1$, and $3c_1$ for a connector 8 which is formed on a housing 32 of the motor shown in FIG. 3. The connector plates 3a, 3b, and 3c are formed in a unitary body by stamping from a metal plate, respectively.

Connecting portions $3a_3$, $3b_3$, and $3c_3$ for connecting the fixing portions $3a_1$, $3b_1$, and $3c_1$ and the terminal portions $3a_2$, $3b_2$, and $3c_2$ are extended substantially parallel with the center axis of the cylindrical portion 2a of the coil bobbin 2 and connected to the fixing portions and the terminal portions perpendicularly, respectively, to make the terminal portions $3a_2$, $3b_2$, and $3c_2$ parallel with each other in a same plane. In a plane view of each of said connector plates 3a, 3b, and 3c, the main portions of the respective terminal portions $3a_2$, $3b_2$, and $3c_2$ are in parallel with the fixing portions $3a_1$, $3b_1$, and $3c_1$ and at the same time, are extended at a position biased to one side of the connecting portions $3a_3$, $3b_3$ and $3c_3$. In this way, the terminal portions $3a_2$, $3b_2$, and $3c_2$ of the connector plates 3a, 3b, and 3c fixed to the end plate 2c of the coil bobbin 2 are positioned apart from the end plate 2c in the direction opposite to the other end plate 2b, the work for winding the coil 4 onto the coil bobbin 2 is not hindered by the terminal portions $3a_2$, $3b_2$, and $3c_2$, and since the fixing portions $3a_1$, $3b_1$, and $3c_1$ project are projected to a position outside in a radial direction of the end plate 2c from the other pheriphery of the end plate 2c, the work of fixing the both ends of the coil wire for forming the coil 4 to the connector plates 3a, 3b, and 3c is facilitated.

Figure 3:
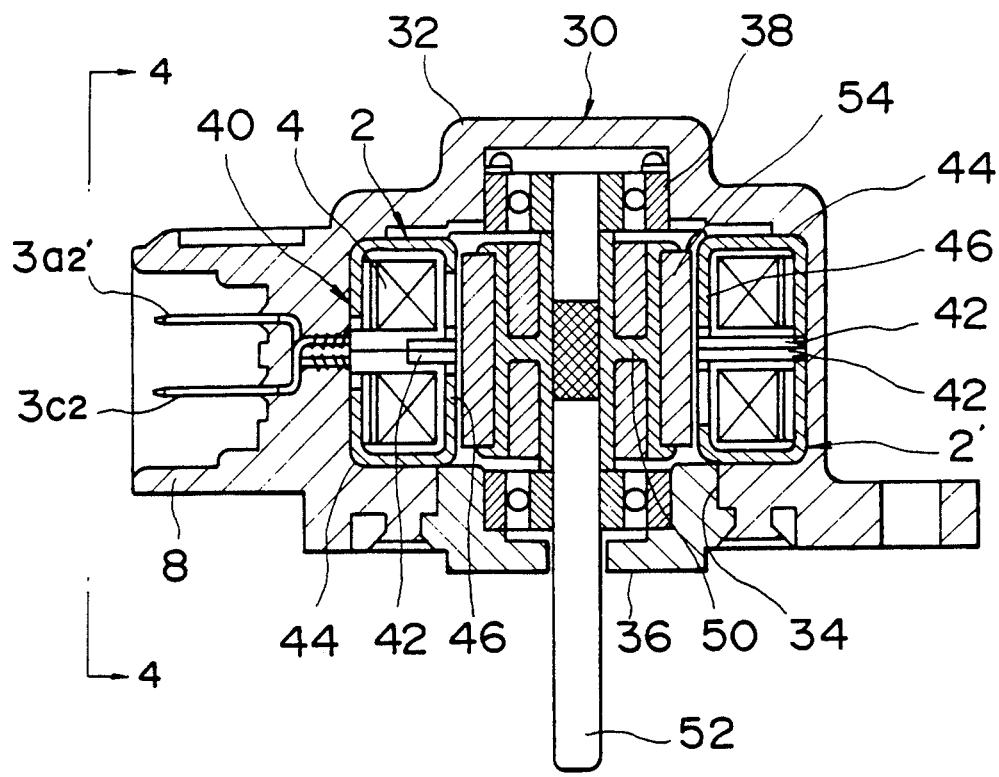
FIG. 3 is a sectional view of a stepping motor related to an embodiment according to the present invention.

FIG. 3 shows an embodiment of a stepping motor 30 which uses the above-mentioned two coil bobbins 2 and 2' of the same construction. The two coil bobbins 2 and 2' are assembled with the end plates 2c for fixing the connector plates 3a, 3b, and 3c opposed to each other, with partition plates 42 and 42 made of soft magnetic material sandwiched concentrically between the both end plates 2c, and with cases 44 and 44 made of soft magnetic material for covering the other end plate 2b in a unitary body to form a stator 40. In the case where the projecting portion 2d of the end plate 2c of the coil bobbin 2 is made thicker than the other portion of the end plate 2b as shown in FIG. 1 and FIG. 2 to facilitate the insertion of the fixing portions $3a_1$, $3b_1$, and $3c_1$ of the connector plates 3a, 3b, and 3c, the thickness of the partition plates 42 and 42 can be made equal to the thickness corresponding to the difference of the thickness between the end plate 2c and the projecting portion 2d.

Figure 4:
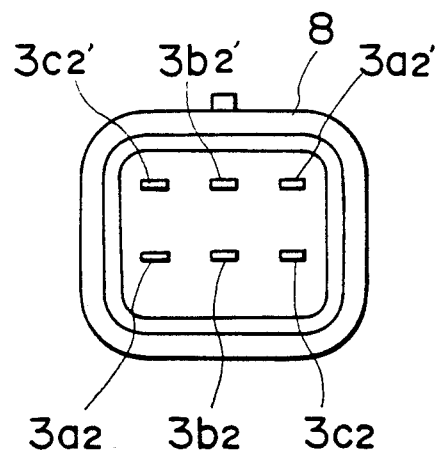
FIG. 4 is a front view of a male connector seen along line 4—4 in FIG. 3.

The connector plates 3a, 3b, and 3c fixed to the projecting portion 2d of the end plate 2c of the coil bobbin 2 have the fixing portions $3a_1$, $3b_1$, and $3c_1$ and the terminal portions $3a_2$, $3b_2$, and $3c_2$ both of which are located in parallel with each other at intervals of the length of the connecting portions $3a_3$, $3b_3$, and $3c_3$ in the axial direction of the coil bobbin 2, and the terminal portions $3a_2$, $3b_2$, and $3c_2$ are shifted to one side relative to the fixing portions $3a_1$, $3b_1$, and $3c_1$. Therefore, when two coil bobbins 2 and 2' are assembled as mentioned before, the terminal portions $3a_2$, $3b_2$, and $3c_2$ of the connector plates 3a, 3b, and 3c fixed to the first coil bobbin 2 are opposed to and arranged in parallel with terminal portions $3c_2'$, $3b_2'$, and $3a_2'$ (See FIG. 3 and FIG. 4) of connector plates 3c, 3b, and 3a of the second coil bobbin 2' (See FIG. 3), by which the connector plates of the both coil bobbins 2 and 2' do not contact with each other.

The stator 40 assembled as described above is inserted into and placed in a mold for forming a housing, a housing 32 made of hard insulating resin material is molded by an injection blow molding with the terminal portions $3a_2$, $3b_2$, $3c_2$, $3a_2'$, $3b_2'$, and $3c_2'$ held in the mold. The stator 40 is fixed via the cases 44 and 44 to the housing 32, and at the same time, the terminal portions $3a_2$, $3b_2$, $3c_2$, $3a_2'$, $3b_2'$, and $3c_2'$ of the connector plates 3a, 3b, 3c are held by the housing 32 to project into a space for forming a connector 8 molded on a circumferential potion of the housing 32.

A cylindrical rotor 50 of the stepping motor 30 has a shaft 52 concentric to the center of rotation and a circumferentially spaced multipolarly magnetized permanent magnet 54 on its outer peripheral surface. The shaft 52 is rotatably held by a bearing 38 which is held in a lid member 36 fixed to an opening 34 of the housing 32 and a bearing 38 which is held in the inside of the housing 32, by which the rotor 50 is concentrically positioned in a bore portion of the stator 40.

Further, in the case 44 of the stator 40, a plurality of pawl-type magnetic poles 46 are formed at the portion opposite to the permanent magnet 54 of the rotor 50.

I claim:

1. An electric motor comprising:
   a housing;
   a stator disposed fixedly in said housing including a coil bobbin formed in a hollow cylindrical shape by insulating material, an exciting coil wound on said coil bobbin, and at least two connector plates made of conductive material and fixed to said coil bobbin at one end thereof at a position apart from said exciting coil, provided projectingly toward the outside in the direction perpendicular to the center axis of said coil bobbin, and extended in parallel with each other;
   a rotor rotatably supported in said housing and positioned concentrically to said stator; wherein
   both ends of the coil wire which forms said exciting coil wound on said coil bobbin of said stator being conductively fixed to respective one of said connector plates fixed to said coil bobbin;
   said housing is molded by insulating hard synthetic resin on the outer surface of said stator; and
   free end portions of said connector plates are made to project outside the outer surface of said housing and insulatingly held by said housing to form a male connector for being supplied with a current from an electric power source.

2. An electric motor according to claim 1, wherein said coil bobbin is formed in a unitary body by a hollow cylindrical portion on which said exciting coil is wound and annular end plates positioned at both ends in the axial direction of said cylindrical portion.

3. An electric motor according to claim 2, wherein each of said connector plates is, at one end thereof, inserted into and fixed to a projecting portion which projects outside in the radial direction from the peripheral portion of one of said end plates, and the thickness of the projecting portion into which said connector plates are inserted is made greater than that of the other portion of said end plate.

4. The electric motor according to any one of claims 1 to 3, wherein the free ends of said connector plates are made to project from the outer surface of said housing to form a male connector together with a molded portion formed on the outer surface of said housing.

5. A stepping motor comprising:
   a housing;
   a stator disposed fixedly in said housing including, a coil bobbin formed in a hollow cylindrical shape by insulating material, an exciting coil wound on said coil bobbin, at least two connector plates made of conductive material and fixed to said coil bobbin at one end thereof at a position apart from said exciting coil and extended in parallel with each other, and a case made of soft magnetic material covering outer and inner circumferences of said bobbin and provided with pawl-type magnetic poles formed at the portion opposed to the inner circumferential surface of said exciting coil;
   a rotor rotatably supported in said housing and positioned concentrically to said stator and provided with a multipolarly magnetized permanent magnet positioned oppositely to pawl-type magnetic poles of said stator on an outer circumferential plane thereof, wherein
   both ends of a coil wire which forms said exciting coil wound on said coil bobbin of said stator are conductively fixed to respective one of said connector plates fixed to said coil bobbin, respectively;
   said housing is molded by insulating hard synthetic resin on the outer circumference of said case; and
   free end portions of said connector plates are made to project outside the outer surface of said housing and insulatingly held by said housing, respectively, to form a male connector for being supplied with a current from an electric power source.

6. A stepping motor according to claim 5, wherein said coil bobbin is formed in a unitary body by a hollow cylindrical portion on which said exciting coil is wound and annular end plates positioned at both ends in the axial direction of said cylindrical portion.

7. A stepping motor according to claim 6, wherein two stators which comprises said coil bobbin, exciting coil, connector plate, and case are assembled by opposing end plates provided projectingly with said connector plates to each other.

8. A stepping motor according to claim 7 wherein the free ends of the connector plates fixed to each of said two coil bobbins are linearly arranged, and said free ends of the connector plates fixed to respective coil bobbins are located in opposed positions with each other and made to project from the outer surface of said housing to form a male connector together with the molding portion formed on the outer surface of said housing.

9. A stepping motor according to claim 8, wherein each of said connector plates fixed to respective coil bobbins comprises a fixed portion inserted into a peripheral portion of said end plate and extended to the radial direction of the coil bobbin, a connecting portion extended in the axial direction of the coil bobbin from the end portion of said fixed portion apart from the coil bobbin, and a terminal portion extended in parallel with said fixed portion from the end portion of said connecting portion, and said terminal portion is deviatedly connected to the end portion of said connecting portion in the plane containing said terminal portion, whereby said connector plates provided projectingly from respective coil bobbins are arranged in the same plane, and connector plates provided projectingly from one coil bobbin and connector plates projecting from the other coil bobbin are arranged in the axial direction of said coil bobbins.

* * * * *